United States Patent [19]

Frank et al.

[11] Patent Number: 4,761,820
[45] Date of Patent: Aug. 2, 1988

[54] ELASTIC SPACER FOR BALL BEARINGS

[75] Inventors: Hubertus Frank, Hochstadt; Andreas Nagengast, Eggolsheim, both of Fed. Rep. of Germany

[73] Assignee: INA Walzlager Schaeffler KG, Fed. Rep. of Germany

[21] Appl. No.: 95,395

[22] Filed: Sep. 10, 1987

[30] Foreign Application Priority Data

Oct. 21, 1986 [DE] Fed. Rep. of Germany ....... 3635725

[51] Int. Cl.$^4$ ............................................. F16C 33/374
[52] U.S. Cl. ..................................................... 384/520
[58] Field of Search .................. 384/520, 551, 523, 526

[56] References Cited

U.S. PATENT DOCUMENTS

| | | | |
|---|---|---|---|
| 1,405,894 | 2/1922 | Borg | 384/520 |
| 2,893,791 | 7/1959 | von Mehren | 384/520 |
| 2,893,792 | 7/1959 | Wikoff et al. | 384/520 |
| 2,897,021 | 7/1959 | Zeilman | 384/520 |
| 2,897,345 | 3/1958 | Zeilman | 384/520 |
| 3,208,806 | 9/1965 | Grolmann et al. | 384/520 |
| 4,175,805 | 11/1979 | Becker et al. | 384/520 |
| 4,277,117 | 7/1981 | George | 384/520 |

FOREIGN PATENT DOCUMENTS

| | | | |
|---|---|---|---|
| 0124246 | 3/1919 | United Kingdom | 384/520 |
| 0983058 | 2/1965 | United Kingdom | 384/527 |

Primary Examiner—Stuart S. Levy
Assistant Examiner—Thomas R. Hannon
Attorney, Agent, or Firm—Bierman and Muserlian

[57] ABSTRACT

An elastic spacer to be inserted between adjacent balls of a ball bearing and having recesses on its faces turned toward the balls into which the balls partially engage, characterized in that the spacer (1) has an outer contour (3) that can be inscribed in a cylinder and its length (L) corresponds to at least one half the diameter of the ball and has in its bore a conical partition (4) which, at least in its central region contiguous to the cone tip (5), is subdivided into elastically resilient tongues (7) by slots (6) extending approximately radially, one ball (2) making approximately punctiform contact in the center and the other ball (2) abutting on the partition (4) in a contact circle.

1 Claim, 1 Drawing Sheet

ELASTIC SPACER FOR BALL BEARINGS

STATE OF THE ART

Elastic spacers prevent adjacent balls from touching each other, but care must be taken that resistance to rotation is not increased by the spacers. On the other hand, the spacer must be dimensioned so that the distance between two adjacent balls is as small as possible to achieve a high carrying capacity of the ball bearing, but the spacer must have sufficient length so as to prevent tilting even at maximum clearance between two adjacent balls. Spacers of this kind are known in a variety of forms and the recesses turned toward the balls are essentially adapted to the spherical form, to thereby achieve a guiding of the balls. The disadvantage of this is, however, that under eccentric load on the bearing, axial forces act on the spacer causing the ball to be embraced with the results of an undesired rapid increase in resistance to rotation. In addition, when the ball is embraced, the lubricant film is broken making the spacer subjected to further load increase, and this may, in the end, lead to its destruction and hence to failure of the bearing.

A major contributing factor here in the known spacers is also the unfavorable flow of force which results from the overly rigid design of the spacers in various regions (see U.S. Pat. No. 2,893,792).

OBJECTS OF THE INVENTION

It is an object of the invention to design an elastic spacer in a simple manner so that the resistance to rotation does not, even under eccentric load, increase to the degree that was common until now and that satisfactory lubrication is ensured, so that premature wear of the rolling surface is avoided.

This and other objects and advantages of the invention will become obvious from the following detailed description.

THE INVENTION

The novel elastic spacer of the invention to be inserted between adjacent balls of a ball bearing and having rises on its faces turned toward the balls into which the balls partially engage, is characterized in that the spacer (1) has an outer contour (3) that can be inscribed in a cylinder and its length (L) corresponds to at least one half the diameter of the ball and has in its bore a conical partition (4) which, at least in its central region contiguous to the cone tip (5), is subdivided into elastically resilient tongues (7) by slots (6) extending approximately radially, one ball (2) making approximately punctiform contact in the center and the other ball (2) abutting on the partition (4) in a contact circle.

This construction results in the advantage that embracing of the ball is no longer possible. On the one hand, the increase in resistance to rotation, even under eccentric load, is thereby greatly diminished and also interruption of the lubricant film is prevented. On the other hand, a spring action is achieved by the slots in the center of the spacer so that the spacer flexes under load at a predefined point and reduces the load wherein sliding of the balls on the rolling surface and hence premature wear is prevented.

Another advantage of the design is seen in that there is a lubricant reservoir in the spacer which, to a certain degree, can take up impurities in the lubricant, so that damage due to impurities is avoided. Besides, reliable guiding is possible due to the length of the spacer so that a tilting of the spacer is prevented even at maximum clearance between two adjacent balls.

Referring now to the drawings.

Figure 1:
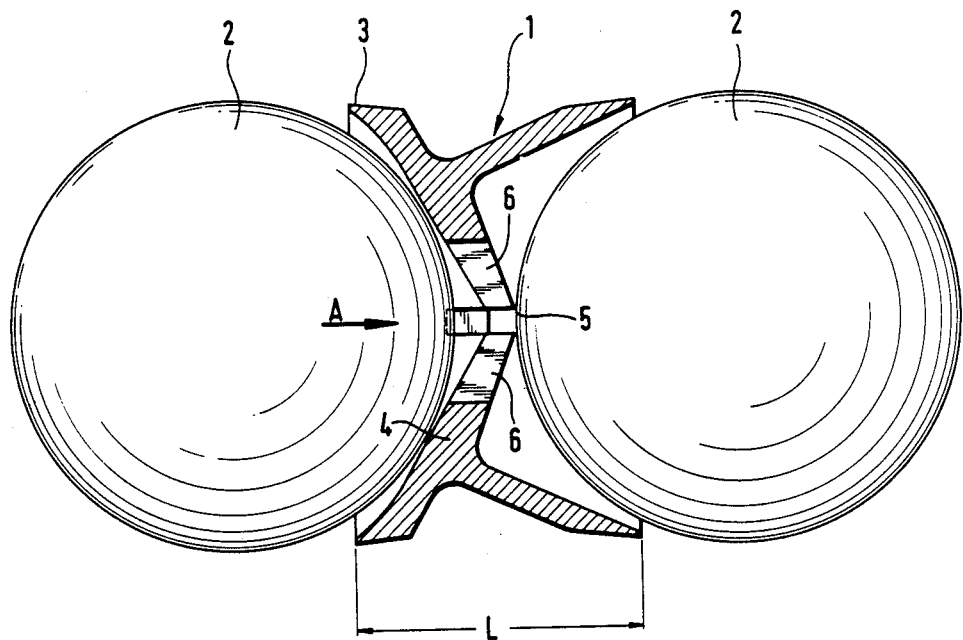
FIG. 1 is a longitudinal cross-section of an elastic spacer of the invention.
Figure 2:
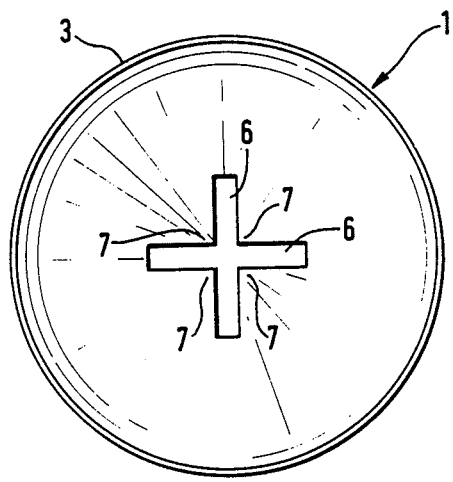
FIG. 2 is a view seen in the direction of arrow A of FIG. 1.

The spacer (1) is inserted between two adjacent balls (2) of a ball bearing not illustrated in detail and has an outer contour (3) that can be inscribed in a cylinder, its length L corresponding to at least half the diameter of the ball. In its bore, the spacer (1) has a conical partition (4) which, at least in its central region contiguous to the cone tip (5), is subdivided into elastically resilient tongues (7) by slots (6) extending approximately radially. As FIG. 1 shows, one ball (2) makes punctiform contact at the center at the cone tip (5) and the other ball (2) abuts on the partition (4) in a contact circle.

Various modifications of the spacer may be made without departing from the spirit or scope of the invention and it is to be understood that the invention is to be lifted only as defined in the appended claims.

What we claim is:

1. An elastic spacer to be inserted between adjacent balls of a ball bearing and having recesses on the faces of the spacer turned toward the balls into which the balls partially engage, characterized in that the spacer (1) has an outer contour (3) that can be inscribed in a cylinder and the length (L) of the spacer corresponds to at least one half the diameter of the ball and the spacer has in its bore a conical partition (4) with a cone tip (5) which, at least in the central region of the spacer contiguous to the cone tip (5), is subdivided into elastically resilient tongues (7) by slots (6) extending approximately radially, one ball (2) making approximately punctiform contact in the center and the adjacent ball (2) abutting on the partition (4) in a contact circle.

* * * * *